Dec. 17, 1940.　　　C. H. HARRISON　　　2,225,008
ROUNDABOUT OR CARROUSEL
Filed March 6, 1939
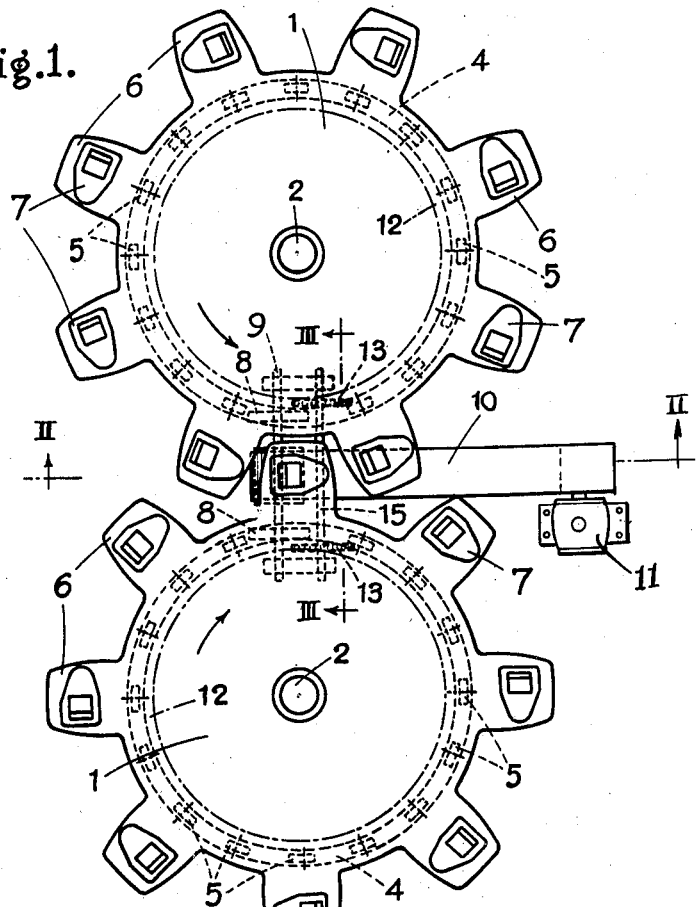
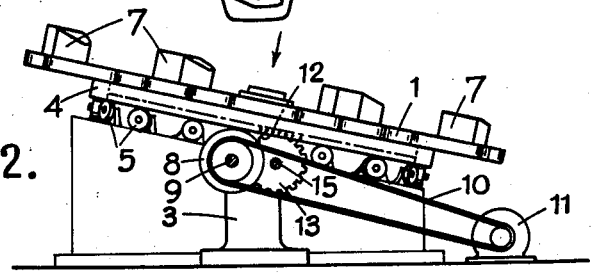
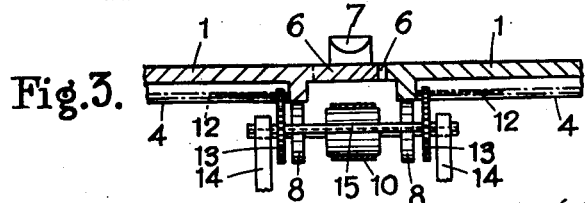
INVENTOR.
C. H. HARRISON Patented Dec. 17, 1940

2,225,008

UNITED STATES PATENT OFFICE 2,225,008

ROUNDABOUT OR CARROUSEL

Charles Henry Harrison, London, England

Application March 6, 1939, Serial No. 260,193
In Great Britain October 20, 1938

3 Claims. (Cl. 272—51)

This invention relates to amusement apparatus of the roundabout type and has for its object to heighten the enjoyment and amusement to be derived from this kind of apparatus by providing means giving novel sensations.

According to this invention amusement apparatus of the roundabout type comprises a plurality of juxtaposed roundabouts of which the passenger carrying devices are arranged to "intermesh" during rotation of the roundabouts. The effect is thereby produced that the passengers on one roundabout receive an impression that they are rushing to a seemingly inevitable collision with those on another. Preferably only two roundabouts are employed.

In carrying out the invention, the passenger carrying devices are angularly spaced around the peripheries of the main frames or platforms of the roundabouts those of one roundabout interfitting with those of another with or without clearance and they may actually form the drive from one roundabout to another. Instead, each roundabout may be independently driven or one used as a master to drive the other through chain and sprocket or other appropriate gear, whilst the interfitting passenger carrying devices only simulate the action of gear teeth. For convenience, any construction within the above terms is referred to herein generally as the "intermeshing" of the passenger carrying devices.

Whereas the passenger carrying devices may themselves be formed as gear-like teeth, it is more desirable to construct the support therefor as the tooth-like member, in which case the respective devices can take any suitable shape so long as they can pass one in between another without obstruction during the rotation of the roundabouts. As mentioned, the tooth-like members, which project from the periphery of the appropriate roundabout frame or platform, may actually interengage and drive after the manner of gear teeth, or they may simulate the drive of the latter.

The passenger carrying devices of the respective roundabouts may be equally pitched about the appropriate roundabout periphery, or they may be disposed at irregular pitches so long as two inter-meshing roundabouts are similarly constructed in this respect so that identically "pitches" devices come together in mesh.

It will be understood that the construction of the passenger carrying devices may take any suitable form to support passengers, although they will usually be in the nature of a "car" wherein a passenger or passengers can be seated.

One practical embodiment of the amusement apparatus according to the invention, will now be described, by way of example, only, with reference to the accompanying drawing which is of a diagrammatic nature and in which—

Figure 1 is a plan in the direction of the arrow shown in Figure 2;

Figure 2 is a cross section on the line II—II of Figure 1; and

Figure 3 is a section on the line III—III of Figure 1.

In the embodiment shown two roundabouts are employed comprising platforms I secured to central inclined spindles 2 which are supported for rotation in pedestals 3 in any suitable manner. Underneath and around the periphery of each platform is secured a bearing ring 4 which runs on angularly spaced rollers 5 mounted in stationary positions around the spindles 2. Projecting from the periphery of each platform are a plurality of tooth-shaped support plates 6 on each of which a passenger carrying device in the form of a car 7 is mounted. The two platforms are spaced so that the tooth-like car supports intermesh after the manner of gear teeth when the roundabouts are rotated and, although in the embodiment, there is always maintained a permanent clearance between intermeshing teeth, they may be arranged to drive. The cars are also shaped approximately as shown so that as they intermesh with the intermeshing of their supports, no obstruction or "knocking" occurs.

In the embodiment each platform is driven independently and separately of the intermeshing of the tooth-like car supports, and for this purpose one of the support rollers is driven and has a friction surface by which a drive is taken to the annular rib or bearing ring 4. These driven rollers, designated 8, are conveniently disposed at the point where the respective roundabouts intermesh and are secured on a common shaft 9, which through a belt or other drive 10, is driven from an electric motor or other prime mover 11.

For the purpose of accurately maintaining the roundabouts in step, a synchronizing gear for each roundabout is preferably provided. Thus pins 12 may project circumferentially about and underneath each platform to form a ring-like rack, and engaging with this rack is a gear or toothed wheel 13 carried on a support 14 and being merely an "idler" wheel. Conveniently both synchronizing toothed wheels 13 are mounted on a common spindle 15 lying parallel with and adjacent to the common drive shaft 9.

In the present embodiment the general plane of the two platforms is inclined to the horizontal as will be seen from Figure 2, but it will be appreciated that they both may be horizontally disposed; instead of being flat, they may be dished or otherwise contoured at the centre, and various other devices such as tunnels, illumination and darkened regions, may be associated with the platforms and the cars and the like to heighten the general entertainment effect of the amusement apparatus according to the invention.

As regards the construction various possibilities are available, and those shown are only given as what has been found in practice to be suitable and convenient both as regards simplicity in manufacture and installation, and costs in production and maintenance.

I claim:

1. In an amusement apparatus, a pair of rotatable platforms provided with intermeshing toothlike projections having tangential pitch lines, passenger carrying means supported on said projections, sets of circumferentially spaced rollers supporting said platform adjacent their peripheries, a shaft connecting the proximal rollers of said sets, means to drive said shaft and the connected rollers, and rotation synchronizing means independent of said driven rollers.

2. The apparatus of claim 1 characterized by having an annular rib on the under side of each platform and against which said rollers engage.

3. The apparatus of claim 1 characterized by having an annular rib on the under side of each platform and against which said rollers engage and wherein the synchronizing means comprises a series of spaced pins projecting inwardly from each rib on radial lines to form gear-like devices, a pair of gears meshing with said gear-like devices adjacent the driven rollers, and a shaft parallel to the first shaft and having said pair of gears fixed thereon.

CHARLES HENRY HARRISON.